Figure 1:
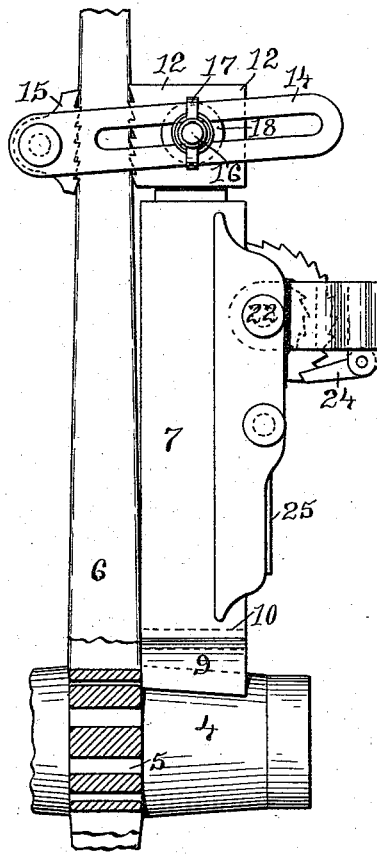

(No Model.)

G. W. MATHEWSON.
POWER JACK.

No. 412,518. Patented Oct. 8, 1889.

WITNESSES:
Chas. H. Luther Jr
M. F. Bligh

INVENTOR:
George W. Mathewson
By Joseph A. Miller & Co.
Attys

UNITED STATES PATENT OFFICE.

GEORGE W. MATHEWSON, OF COVENTRY, RHODE ISLAND.

POWER-JACK.

SPECIFICATION forming part of Letters Patent No. 412,518, dated October 8, 1889.

Application filed December 26, 1888. Serial No. 294,616. (No model.)

*To all whom it may concern:*

Be it known that I, GEORGE W. MATHEW-SON, of Coventry, in the county of Kent and State of Rhode Island, have invented certain new and useful Improvements in Power-Jacks, of which the following is a full, clear, and exact description, reference being had to the accompanying drawings, forming part of this specification.
This invention has reference to an improvement in power-jacks, by which the same are especially adapted for use in drawing or pulling out the spokes from the hubs of wheels without injuring the hubs, and is also readily adapted for pressing together the boards for floors before nailing.

For these purposes the invention consists in the peculiar and novel construction of the frame in which the rack slides by providing the end with a concaved bearing to fit the hub and with a hole through which a pin is driven when the device is used for a floor-jack.

The invention further consists in providing the head of the rack-slide with an adjustable clamping device, by means of which the spoke can be firmly held and drawn from the mortise of the hub, as will be more fully set forth hereinafter.

In the drawings similar numbers of reference indicate corresponding parts throughout.

Figure 2:
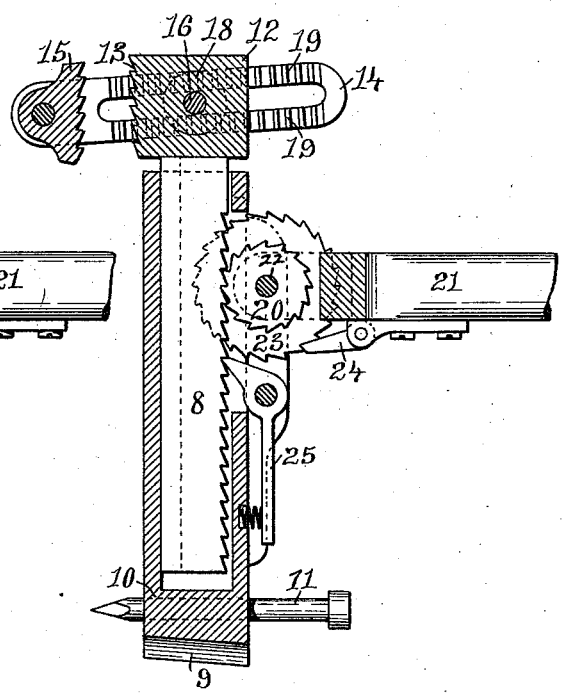
Figure 3:
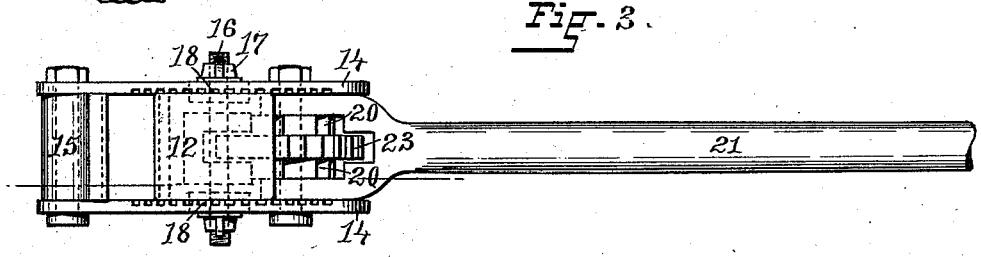

Referring to the drawings, Figure 1 is a side view of the improved power-jack, showing the same supported on the hub and secured to a spoke to be drawn from the mortise of the hub. Fig. 2 is a sectional view of my improved power-jack, and Fig. 3 is a top view of the same.

In the drawings, 4 designates the hub of a wheel; 5, the mortise or socket in which the tenon of the spoke 6 is secured. The spokes of wheels are firmly secured in the hub, and when on account of injury to the spokes, or any one of them, a spoke has to be removed (which is a matter of very frequent occurrence in any blacksmith or wagon-maker's shop) it is important that the spoke should be drawn out without injuring the mortise, into which the new spoke must fit accurately. For this purpose the spoke must be drawn out straight on the line of its axis. In large wheels this is a slow and laborious process.

I have especially designed my improved power-jack for the purpose of performing the extraction of spokes from hubs, causing great saving in time and preserving the mortise in the hub, while the improved power-jack is also useful for many other purposes for which power-jacks are used.

My improved power-jack consists of the metal standard 7, in which the rack-bar 8 slides. The lower end of the standard 7 is provided with a concaved bearing 9, fitting the surface of the hub of a wheel, so as to form a firm support for the power-jack when used for drawing spokes from a hub. It is also provided with the hole 10, through which the pin 11 is inserted when the power-jack is used for a floor-jack to secure the standard to the floor-joists. The rack-bar is provided with the head 12, one side of which head has the serrated face 13. The links 14 14 are connected at one end by a bar which carries the clamp 15, the face of which is serrated like the face 13, so as to secure a firm hold on the spoke, as is shown in Fig. 1.

To firmly hold the links 14 to the head, I secure the bolt 16 in the head 12 and provide both ends with a screw-thread and with clamping-nuts 17. Into the sides of the head 12 and surrounding the bolt 16, I insert the circular disks 18 18, as shown in broken lines in Fig. 3. The outer faces of these disks 18 are provided with projecting ribs which enter the grooves 19 on the inner surface of the links 14. When now the links 14 are secured by the clamp-nuts 17, the ribs of the disks 18 enter the grooves of the links and thus hold them firmly against strain on the links and still allow the links, and with the same the clamp 15, to turn on the bolt to adjust the clamp to the spoke.

The rack-bar is shown as provided with ratchet or saw teeth, as is also the pinion 20; but both may be provided with the usual gear-teeth. The lever 21 is hinged on the shaft 22, and on the shaft 22 the ratchet-wheel 23 (a part of which extends into a groove formed in the ratchet-bar) is secured, having on each of its sides the pinions 20, operating the rack-bar 8. The pawl 24 connects the lever 21 with the ratchet-wheel 23 and operates the pinions 20 in one direction to raise the rack-bar 8, which is held in the raised position by the stop-pawl 25. The lever can then be moved in the opposite direction, the pawl 24 sliding over the ratchet-teeth of the wheel 23.

Having thus described my invention, I claim as new and desire to secure by Letters Patent—

1. The combination, in a power-jack, of a head provided with the bolt 16, clamp-nuts 17, the disk 18, links 14, and clamp 15, constructed to operate as and for the purpose described.

2. The combination, with the head of a power-jack provided with the bolt 16 and clamp-nuts 17, of the ribbed disk 18, the grooved links 14, and the clamp 15, as described.

3. A power-jack consisting of the standard 7, the rack-bar 8, provided with saw-tooth-sectioned teeth and with the head 12, the pinion 20, the ratchet-wheel 23, the lever 21, the pawl 24, connected with the lever 21, and the spring-pressed stop-pawl 25, pivoted in the standard 7, constructed to engage with the saw-tooth-sectioned rack of the rack-bar, as described.

4. In a power-jack, the combination, with the standard 7, provided with the concaved end 9, the rack-bar 8, provided with the head 12, the pinion 20, ratchet-wheel 23, the lever 21, pawl 24, and stop-pawl 25, of the bolt 16, clamp-nuts 17, disk 18, links 14, and clamps 15, constructed to extract the spokes from the hub, as described.

GEORGE W. MATHEWSON.

Witnesses:
 JOSEPH A. MILLER,
 JOSEPH A. MILLER, Jr.